W. J. CAMPBELL.
DRAFT EQUALIZER.
APPLICATION FILED FEB. 27, 1912.
1,027,988.
Patented May 28, 1912.
Fig. 1.
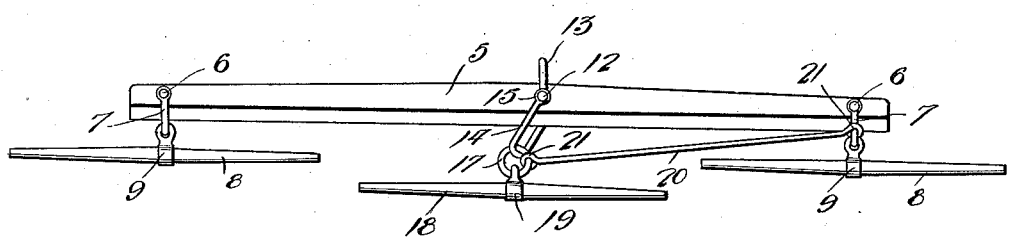
Fig. 2.
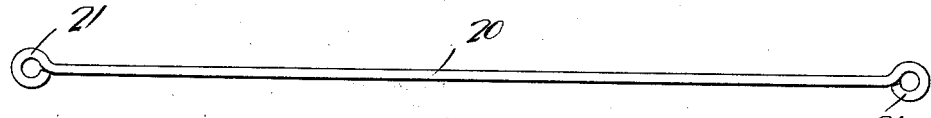
Fig. 3.
Witnesses
Carroll Bailey.
E. L. Mueller.
Inventor
William J. Campbell,
By Victor J. Evans
Attorney

UNITED STATES PATENT OFFICE.

WILLIAM J. CAMPBELL, OF HONEY GROVE, PENNSYLVANIA.

DRAFT-EQUALIZER.

1,027,988.  Specification of Letters Patent.  Patented May 28, 1912.

Application filed February 27, 1912. Serial No. 680,306.

*To all whom it may concern:*

Be it known that I, WILLIAM J. CAMPBELL, a citizen of the United States, residing at Honey Grove, in the county of Juniata and State of Pennsylvania, have invented new and useful Improvements in Draft-Equalizers, of which the following is a specification.

The general object of this invention is to provide a three-horse equalizer particularly adapted to be applied to agricultural implements and to prevent the center animal from crowding over and interfering with the work of the others, thus distributing the work evenly. This object is attained, essentially, by the provision of a connecting rod between the center draft and one of the side drafts, said rod being adapted to limit the lateral movement of the said center draft.

In carrying out the objects of the invention generally stated above, it will be understood, of course, that the essential features thereof are necessarily susceptible to changes in details and structural arrangements, one preferred and practical embodiment being shown in the accompanying drawings, wherein:—

Figure 1 is a perspective view of the equalizer constructed in accordance with the invention. Fig. 2 is a central transverse sectional view through the equalizer bar showing the means for attaching the central swingletree thereto. Fig. 3 is a plan view of the connecting rod.

Referring more particularly to the accompanying drawing wherein like reference characters designate similar parts, it will be seen that the invention comprises an equalizer bar 5 of any well known construction. Adjacent each end of the bar 5, the same is provided with vertical openings through which are passed securing elements 6 such as bolts of any ordinary construction. Pivotally connected to the elements 6 are U-shaped clips 7 extending forwardly from the said bar 5 and to each of these clips 7 there is attached a swingletree 8 by means of a connecting element 9. Medially the ends of the equalizer bar 5, there is provided a vertical opening 10 through which is passed a pivot bolt 11 having the usual head 12. A shackle 13 is pivotally connected to the bolt 11 and extends rearwardly from the equalizer bar 5, said shackle being adapted to be connected to a plow or other agricultural implement in any preferred manner. An elongated U-shaped yoke 14 having flattened extremities 15 is also pivotally mounted upon the bolt 11 by means of apertures 16 which are provided in said flattened extremities 15, said yoke 14 extending forwardly from said equalizer bar 5. A ring 17 loosely engages the yoke 14 and has connected thereto a swingletree 18 by means of a connecting element 19. In order to limit the lateral movement of the swingletree 18 so that the animal attached thereto will not interfere with the work of the other animals, an elongated connecting rod 20 provided at its ends with eye terminals 21 is connected to the ring 17 and one of the clips 7 by means of the said eye terminals. It will thus be seen by reason of this connecting rod 20, the lateral movement of the swingletree 18 will be limited.

From the foregoing description it will be obvious that the invention provides an equalizer which is simple in construction thus reducing the cost of manufacture of the same to a minimum, and which is positive and effective in carrying out this purpose.

Having thus described my invention, what I claim as new is:—

A device of the character described comprising an equalizer bar, a pivot element engaging said bar medially of its ends, an elongated U-shaped yoke pivotally mounted upon said pivot element, a ring engaging said yoke, a swingletree connected to said ring, swingletrees connected to each end of said equalizer bar, and a rod having eye terminals connecting said end swingletrees, said rod being adapted to prevent lateral movement of the first named swingletree.

In testimony whereof I affix my signature in presence of two witnesses.

WILLIAM J. CAMPBELL.

Witnesses:
WILBERFORCE SCHWEGEN,
S. C. STONER.

---

Copies of this patent may be obtained for five cents each, by addressing the "Commissioner of Patents, Washington, D. C."